No. 867,708. PATENTED OCT. 8, 1907.
T. R. & J. H. DEMERY.
AUTOMATIC PLATE PRINTING MACHINE.
APPLICATION FILED AUG. 14, 1906.

6 SHEETS—SHEET 1.

WITNESSES:

INVENTORS
Thomas R. Demery and Joseph H. Demery
J. B. Schermerhorn
ATTORNEY.

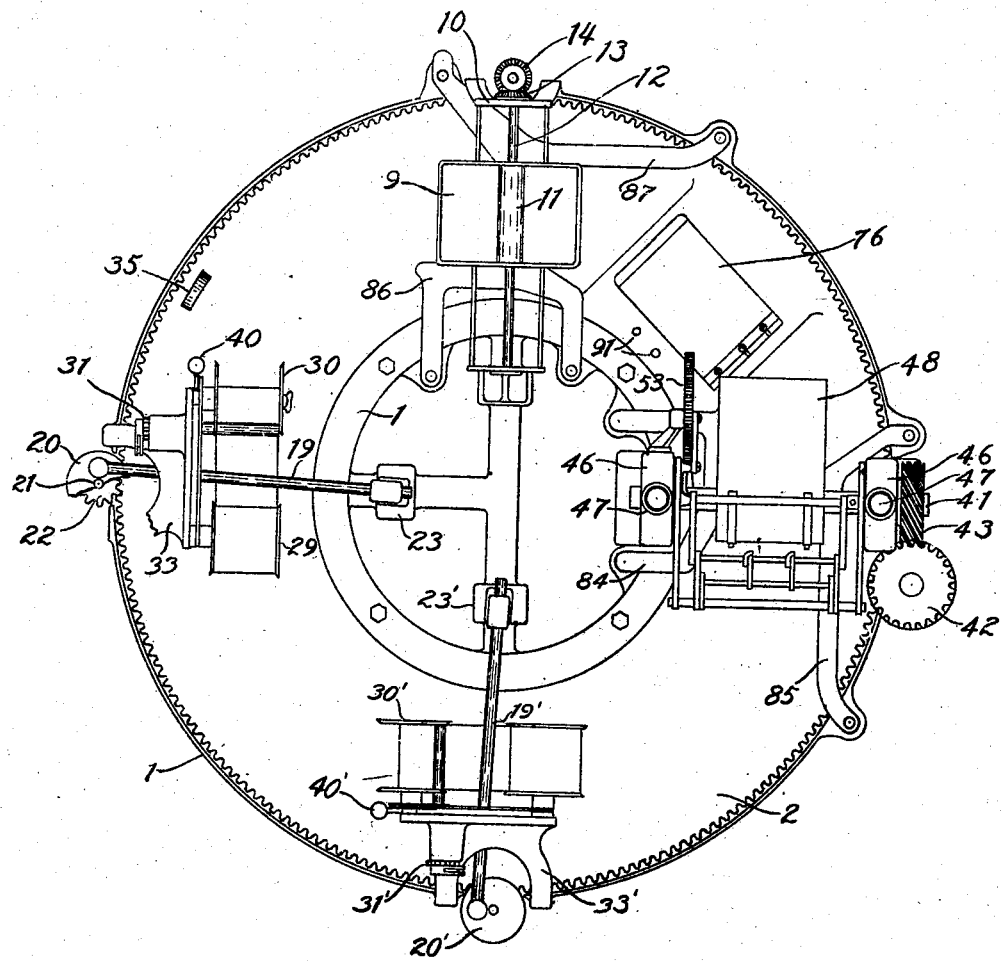

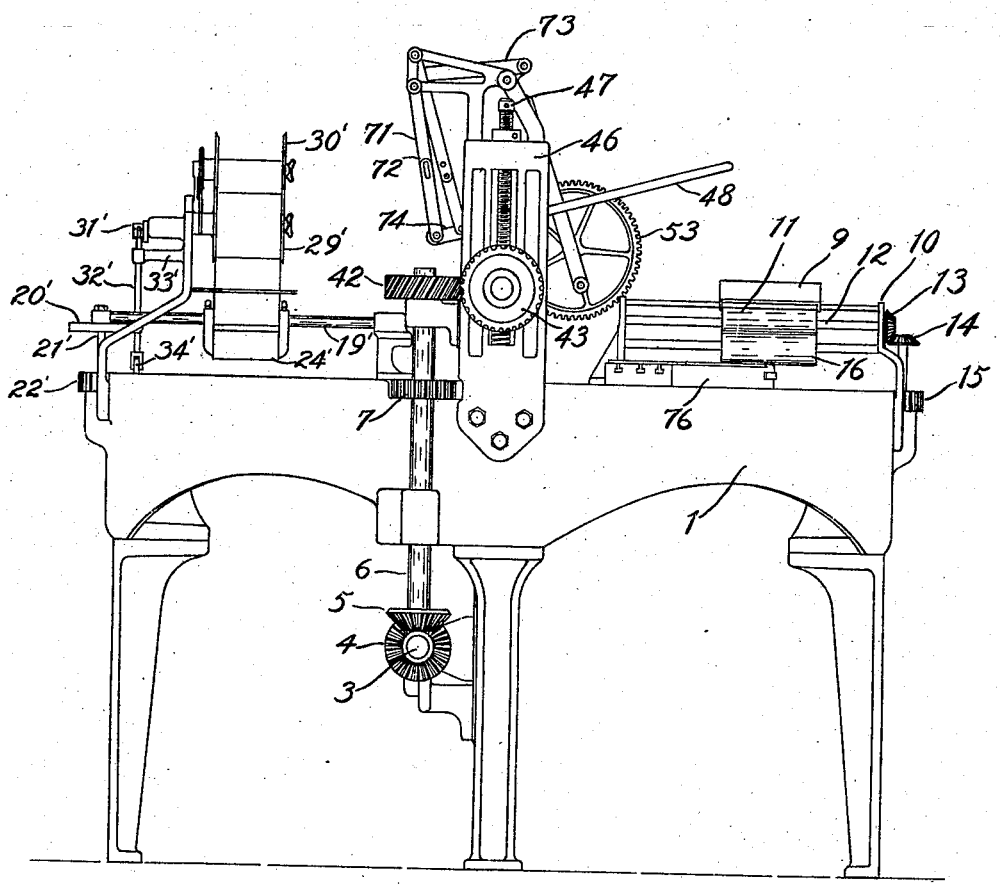

No. 867,708.  
PATENTED OCT. 8, 1907.  
T. R. & J. H. DEMERY.  
AUTOMATIC PLATE PRINTING MACHINE.  
APPLICATION FILED AUG. 14, 1906.  
6 SHEETS—SHEET 4.
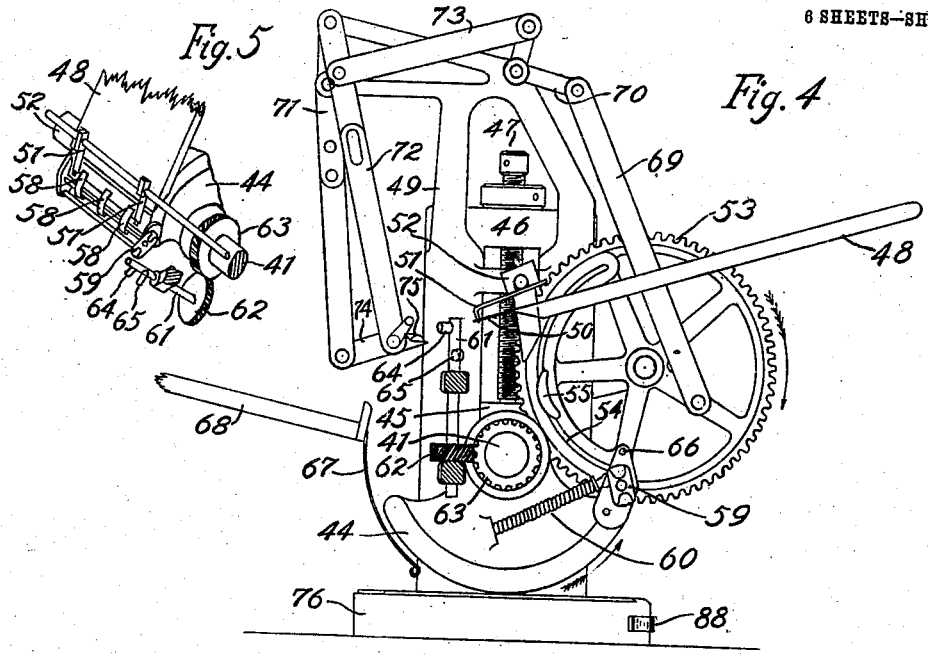
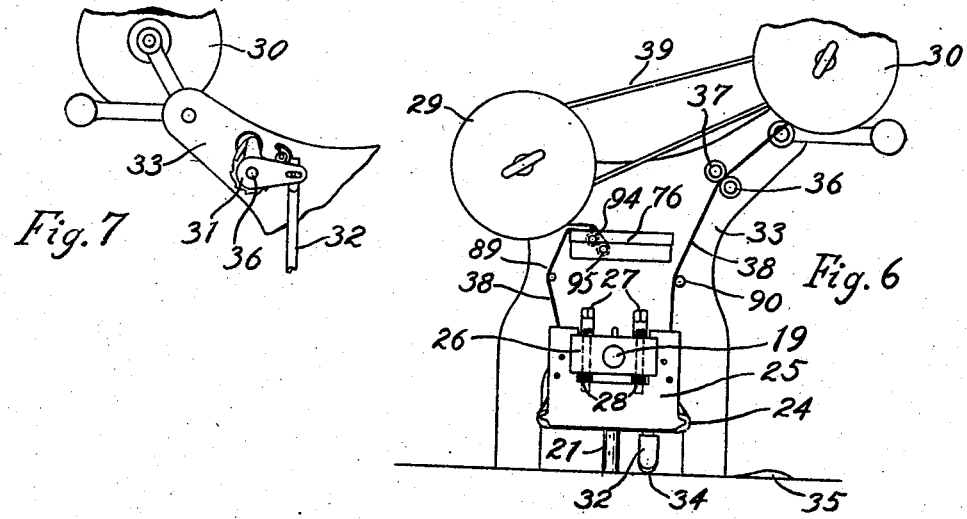
WITNESSES:  
INVENTORS  
Thomas R. Demery  
Joseph H. Demery  
BY  
H. B. Schermerhorn  
ATTORNEY.

No. 867,708. PATENTED OCT. 8, 1907.
T. R. & J. H. DEMERY.
AUTOMATIC PLATE PRINTING MACHINE.
APPLICATION FILED AUG. 14, 1906.

6 SHEETS—SHEET 5.

No. 867,708. PATENTED OCT. 8, 1907.
T. R. & J. H. DEMERY.
AUTOMATIC PLATE PRINTING MACHINE.
APPLICATION FILED AUG. 14, 1906.
6 SHEETS—SHEET 6.
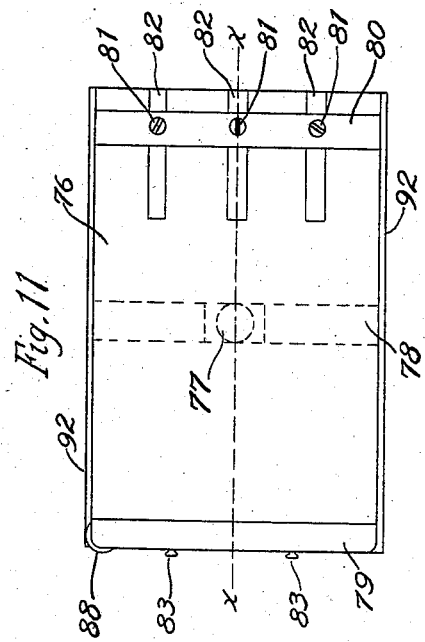
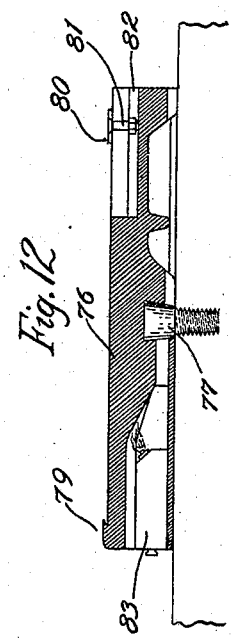
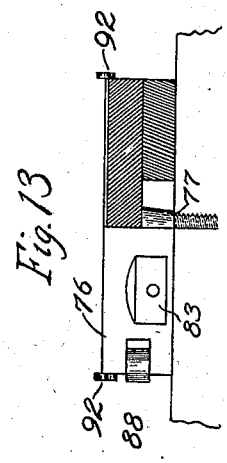
WITNESSES:
INVENTORS
Thomas R. Demery
Joseph H. Demery
BY
H. B. Schermerhorn
ATTORNEY.

UNITED STATES PATENT OFFICE.

THOMAS R. DEMERY AND JOSEPH H. DEMERY, OF PHILADELPHIA, PENNSYLVANIA.

AUTOMATIC PLATE-PRINTING MACHINE.

No. 867,708.　　　　　　Specification of Letters Patent.　　　　　　Patented Oct. 8, 1907.

Application filed August 14, 1906. Serial No. 330,529.

*To all whom it may concern:*

Be it known that we, THOMAS R. DEMERY and JOSEPH H. DEMERY, citizens of the United States, residing at Philadelphia, in the county of Philadelphia and State of Pennsylvania, have invented certain new and useful Improvements in Automatic Plate-Printing Machines, of which the following is a specification.

My invention relates to automatic plate printing machines, and my object is to provide a machine whereby the operations of inking, wiping and polishing engraved plates and of printing therefrom may be successively performed.

This object I accomplish by the means hereinbelow described and shown in the accompanying drawings, in which—

Figure 1:
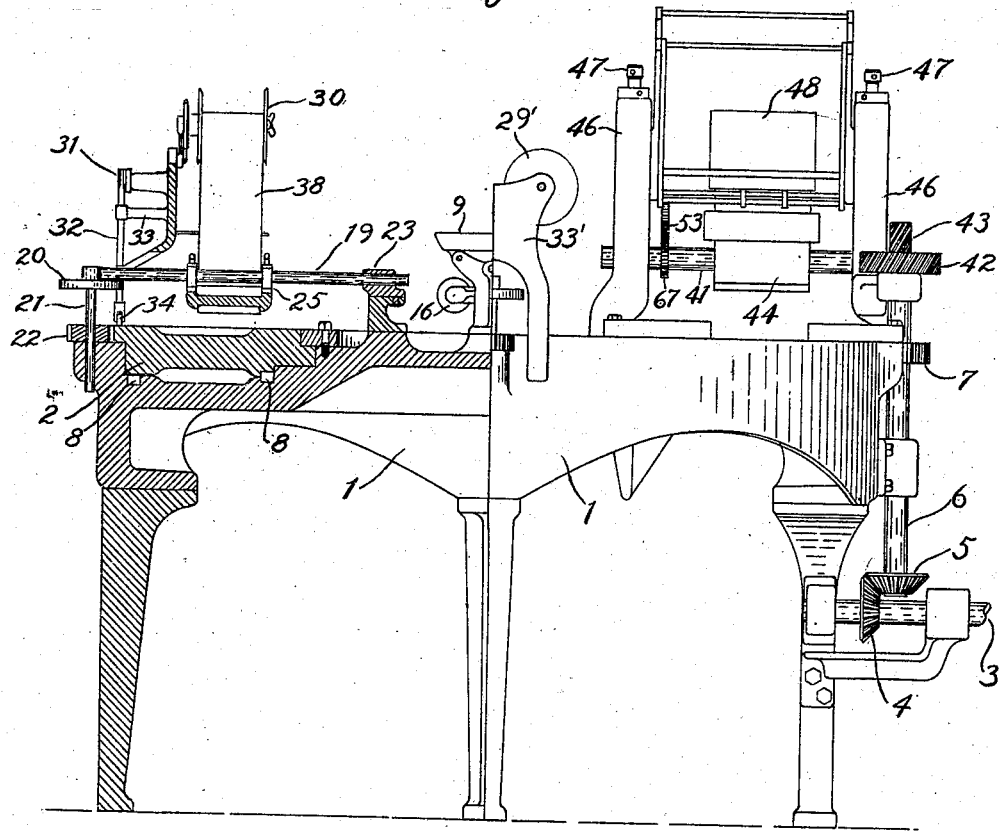
Figure 10:
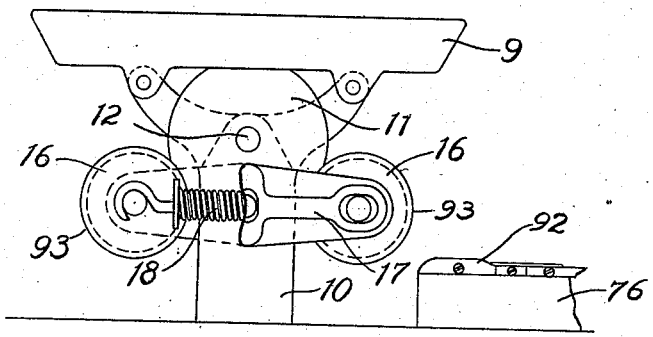
Figure 8:
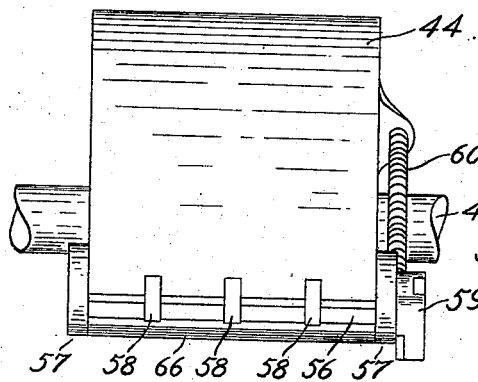
Figure 9:
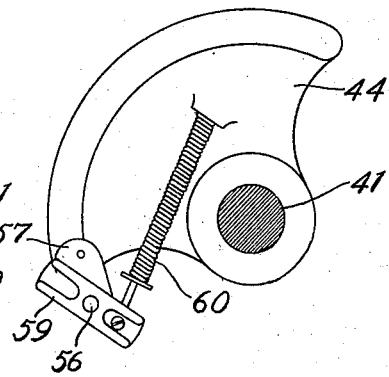

Figure 1 is a view, in elevation, of the entire machine, partly in vertical section and partly in perspective, showing the impression and wiping mechanisms. Fig. 2 is a view, in plan, of the entire machine, showing the inking, wiping, polishing and impression mechanisms. These are shown in the order named, beginning at the top of the drawing and moving to the left around the circle. Fig. 3 is a view in elevation, of the entire machine, showing all parts with the exception of the wiping mechanism, which is directly in line behind the impression mechanism. Fig. 4 is a detailed view, in elevation, of the impression mechanism, with the outer housing removed, showing the means for actuating the impression segment and for feeding and delivering the sheet. Fig. 5 is a detailed view of a portion of Fig. 4, showing the means for feeding the sheet to the impression segment and for gripping it thereon. Fig. 6 is a view, in elevation, of the polishing mechanism. Fig. 7 is a detail of Fig. 6, showing the mechanism for actuating the winding roll. Fig. 8 is a detailed view of the impression segment, showing the means for holding the sheet in position thereon during the taking of an impression. Fig. 9 is a detailed end view of Fig. 8, showing the mechanism controlling the gripping means shown in Fig. 8. Fig. 10 is a view, in elevation, of the inking mechanism. Fig. 11 is a view, in plan, of the printing bed. Fig. 12 is a view, in vertical section, of the printing bed on the line X—X, Fig. 11. Fig. 13 is a view of the end of the printing bed, one half in end elevation and one-half in vertical cross section.

In Fig. 1 the annular rotary table 2 is mounted upon the roller bearings 8 in the base 1, as shown in vertical section at the left-hand side of Fig. 1, and is rotated by the power-shaft 3, miter-gears 4 and 5, vertical shaft 6 and gear 7, the latter engaging gearing on the periphery of said table. The base 1 supports the inking, wiping, polishing and impression mechanisms, which are mounted over the rotary table 2 at the four quarters thereof in the manner shown in Fig. 2. These mechanisms will be described in the above named order.

The inking mechanism is shown in plan in Fig. 2, in elevation in Fig. 3 and in elevation, on a larger scale, in Fig. 10. In Fig. 10 the fountain 9, containing the ink, is supported by suitable brackets 10 above the feed roll 11, which enters the base of the fountain as shown in the plan view in Fig. 2, and draws therefrom the supply of ink to be transferred to the inking rolls. The feed roll shaft 12 is journaled in the brackets 10, and is actuated by the gears 13, 14 and 15, Fig. 3, the gear 15, engaging the periphery of the rotary table 2 and being driven thereby. The inking rolls 16, Fig. 10, are mounted in separate frames provided with adjustable bearings 17, and are held in place by the compression springs 18, allowing an adjustment of the inking rolls to the surface of the feed roll during the process of inking. Thus the ink drawn from the fountain 9 by the feed roll 11 is fed by the latter to the inking rolls 16 and by them transferred to the engraved plate.

The printing bed, hereinafter described, is designed to hold an engraved plate of any size up to the maximum which the dimensions of the bed will accommodate. Where a relatively smaller plate is to be used, it is necessary to provide a means for limiting the action of the inking rolls 16 to the dimensions of the plate or, as far as the top and bottom of the plate are concerned, to the engraved surface of the plate. This is accomplished as follows:

Each side of the printing bed is furnished with a sectional track 92, Figs. 10, 11 and 13, the end sections of which are slightly raised, as shown in Fig. 10. The inking rolls 16 are furnished with disks 93 at each end, of slightly greater diameter than the inking rolls and adapted to travel upon said track as the printing bed moves in a right-line beneath the inking mechanism. By an examination of the end of printing bed and track shown in Fig. 10 it will be seen that the raised sections of track are flush with the surface of the engraved plate while the intermediate sections are below said surface to the extent of the difference in diameter between the inking rolls and the disks 93 on the ends thereof. In consequence, the inking rolls are kept from contact with the printing bed and plate to the extent of the raised sections of track. The entire length of track is formed in sections removably secured to the sides of the printing bed, so that one set of raised sections may be removed and another longer or shorter set substituted, in accordance with the dimensions of the plate or of inked surface desired.

The wiping and polishing mechanism are in all respects identical in construction, save that the latter is provided with an additional element hereinafter described. In describing the wiping mechanism, therefore, reference will be made alike to the drawings showing both wiping and polishing mechanisms. The wiping mechanism is shown in plan in Fig. 2 and in elevation in Fig. 1. For the reason given above, Figs. 6 and 7, which, strictly speaking, illustrate the polishing mechanism, will also be used in explanation of the wiping mechanism. The function of the wiping mechanism is the removal of superfluous ink from the surface of the engraved plate after the latter has passed under the inking mechanism above described. In Figs. 1 and 2 the outer end of the rod 19 is connected to the disk 20 which is actuated by the shaft 21 and gear 22, the latter being geared to the rotary table 2. The inner end of the rod 19 is mounted in the bearing 23, adapted to allow the oscillating and to-and-fro movement of the rod imparted by the rotation of the disk 20.

The rod 19 carries the wiping-pad 24 an end view of which is shown on a larger scale in Fig. 6. The wiping-pad is mounted in the frame 25, Fig. 6, which in turn is secured to the block 26 through which the rod 19 passes, by the tension bolts 27, whereby the pressure of the wiping-pad upon the engraved plate may be regulated. The motion of the rod 19 thus imparts a horizontal rotary movement to the wiping-pad, duplicating the action of the hand in wiping the plate. The springs 28 Fig. 6, coiled about the tension bolts 27 allow a limited vertical play of the wiping pad 24 and its frame 25 as the engraved plate passes beneath the former, thus insuring a positive contact between the wiping pad and plate.

The strip of wiping cloth 38, Fig. 6, is carried from the delivery roll 29, down over the wiping-pad 24 and thence upward to the winding roll 30. A periodic movement of the cloth strip is secured by the ratchet and pawl movement 31, shown in detail in Fig. 7, which is in turn actuated by the ratchet rod 32 suitably mounted in the frame 33, Fig. 1. The lower end of the ratchet rod 32 is furnished with a small roller 34, Figs. 1 and 6, which runs upon the surface of the rotary table 2. The necessary impulse is communicated to the ratchet rod by the member 35 shown in plan in Fig. 2 and in elevation in Fig. 6, secured in the surface of the rotary table 2 in the path of the roller 34. As the roller 34 passes over the member 35 in the course of the rotation of the table a vertical impulse is communicated to the ratchet rod 32 which actuates the ratchet and pawl mechanism 31, thus shifting the wiping strip upon the wiping pad at each revolution of the rotary table by the means hereinbelow described. The member 35 may be duplicated if a more frequent shifting of the wiping strip is desired.

The ratchet mechanism 31, Fig. 7, actuates the roller 36, Fig. 6, which is mounted in the frame 33 and is adjusted to bear firmly against the roller 37. The rollers 36 and 37 thus holding the strip of wiping cloth 38 tightly between them operate to shift the wiping cloth at each movement of the ratchet, unwinding from the delivery roll 29 and winding on the winding roll 30. The winding roll 30 is geared to the delivery roll 29 by the pulley belt 39. When the winding roll is full it ceases to revolve, the pulley belt being adjusted for the purpose to just sufficient tension to actuate the winding roll up to that point; the pulley belt thereafter slipping upon its pulleys By this means the surface of cloth over the wiping pad is periodically renewed.

By reference to Fig. 6 it will be seen that the rollers 89 and 90 over which the wiping strip 38 passes are so located in the frame 33 as to tend to keep the wiping strip taut during the eccentric movement of the wiping pad. This is further assisted by the tension maintained upon the wiping strip by the action of the rollers 36 and 37.

The function of the polishing mechanism is to complete the preparation of the engraved plate for the final process—the taking of an impression therefrom. In the polishing mechanism the plate is accordingly treated by a polishing-pad actuated by precisely the same means as in the case of the wiping-mechanism hereinabove described. The cloth used in polishing is, in like manner, carried from a delivery roll downward over the polishing-pad and upward to the winding roll, the means for periodically shifting the cloth strip being identical with those employed in the wiping mechanism.

The polishing mechanism, in part, is shown in plan in Fig. 2, in elevation in Fig. 3 and in detail on an enlarged scale in Figs. 6 and 7. To avoid confusion, the corresponding parts of the wiping and polishing mechanisms have been designated by the same numbers of reference, the parts in the polishing mechanism being distinguished by the additional designation of prime. Thus in Fig. 3, $19^1$ is the rod actuating the polishing-pad $24^1$ by means of the shaft $21^1$ and gear $22^1$. The block $26^1$, frame $25^1$ and tension bolts $27^1$ are shown in Fig. 6, which also shows the manner in which the polishing-cloth passes from the delivery roll $29^1$ to the polishing pad and thence to the winding roll $30^1$. The mechanism for actuating the delivery roll $29^1$, namely the ratchet movement $31^1$, and rod $32^1$ and roller $34^1$ is identical with that above described with reference to the wiping-mechanism and shown in Figs. 6 and 7. The polishing mechanism is actuated by the gearing on the periphery of the rotary table 2, as in the case of the inking and wiping mechanisms above described.

The sole difference between the wiping and polishing mechanisms consists in the addition to the latter of the tank 76, shown in Fig. 6. This contains a liquid compound through which the cloth is passed on its way to the polishing pad, said liquid increasing the effectiveness of the cloth strip in polishing the plate. While any compound or substance suitable for this purpose may be used in said tank, I employ preferably a liquid composition, the invention of George W. Schooley and myself, and covered by United States Letters Patent No. 780,328, dated January 17, 1905.

The quantity of liquid applied to the cloth strip in its passage through the tank 76 may be regulated by the adjustable compressing rollers 94 and 95 located therein and over which the cloth strip passes after immersion in the liquid.

From the polishing mechanism above described the plate is carried by the rotary table 2 to the impression or printing mechanism. This is shown in elevation in Fig. 1, in plan in Fig. 2, in side elevation in Fig. 3, and in side elevation on an enlarged scale in Fig. 4. The impression segment forming part of said mechanism is also shown in detail in Figs. 8 and 9.

The actuating means for the impression mechanism is shown in Fig. 1, wherein the vertical shaft 6 actuates the horizontal shaft 41 by means of the gears 42 and 43. The mode in which the power is applied to the horizontal shaft 41 is also clearly shown in Fig. 2.

The impression segment 44, Fig. 4, is mounted upon and actuated by the shaft 41, the direction of its rotation being indicated by an arrow in the drawing. The printing bed with its engraved plate, to be hereinafter described, are there shown in the act of passing beneath the impression segment, which makes four complete revolutions to one complete rotation of the rotary table 2 and printing bed, the rate of movement of the rotary table and impression segment being the same. Thus, in Fig. 4, as the printing bed and plate moves forward from left to right the heel of the impression segment, *i. e.* the right hand end as shown in the drawing, comes down upon the head of the plate, rolling over the same from end to end.

The shaft 41 carrying the impression segment 14 rotates in the adjustable bearings 45 mounted in the housings 46. The vertical adjustment of said bearings is effected by means of the set screws 47 mounted in said housings. The very slight adjustment needed in order to materially increase or decrease the pressure of the impression segment on the plate is not sufficient to interfere with the meshing of the gears 42 and 43, Fig. 1.

Each sheet is fed to the impression segment, held thereon during the process of printing and delivered therefrom when the impression has been taken. The means for feeding, gripping and delivering are shown in detail in Figs. 4, 5, 8 and 9. The feed mechanism is as follows:

The inclined feed table 48, Fig. 4, supported by the frame 49, has a beveled edge furnished with a further extension edge of spring metal 50. The blank sheet is adjusted on the feed table 48 by sliding the sheet down until its edge is flush with the edge 50. Further movement of the sheet is prevented by the fingers 51, which retain the sheet at that point until the moment for its delivery to the impression segment. The fingers 51 are controlled by the cam 52 pivoted in the frame 49. The gear wheel 53 bracketed to the frame 49 is furnished with the semi-circular slot 54 in which is adjustably secured the tumbler 55. The gear wheel 53 is actuated by the gear 67, Fig. 1, on the shaft 41, the revolution of the gear wheel 53 being in the direction indicated by an arrow in Fig. 4. The fingers 51 being normally in the position shown, the contact of the tumbler 55 with the cam 52 operates to raise the fingers 51 and to allow the sheet to be drawn from the board by the gripping mechanism attached to the heel of the impression segment. The gripping mechanism is shown in Figs. 4, 5, 8 and 9. Its action is as follows:

The heel of the impression segment 44, is furnished with the semi-rotating shaft 56, Fig. 8, mounted in the brackets 57 secured to each side of the heel. The shaft 56 carries the grippers 58 and is actuated by the upsetting cam 59 mounted upon said shaft on the outer side of the heel of the impression segment as shown in Fig. 9. The upsetting cam 59, being semi-rotated by the means hereinafter described, is maintained in either position by the compression spring 60, one end of which is secured to the body of the impression segment, while the other is pivotally secured to the upsetting cam 59. The semi-rotation of the upsetting cam 59 thus actuates the grippers 58, Fig. 8, by means of the shaft 56 on which they are mounted, the semi-rotation of the upsetting cam being accomplished as follows:—

In Fig. 4 the vertical shaft 61 mounted in brackets in the frame 49, is rotated by the gear 62, which in turn is actuated by the gear 63 on the shaft 41, the ratio of the gears 62 and 63 being one to four. The vertical shaft 61 is provided with the pins 64 and 65 set horizontally on the vertical shaft 61 at 90 degrees from each other.

As the heel of the impression segment moves upward in the revolution of the segment the grippers 58 are, by the action of the upsetting cam 59 and compression spring 60, thrown back from the surface of the impression segment and rest upon the rod 66, Fig. 8, which is mounted in the brackets 57 and which prevents the grippers from being carried too far back by the semi-rotation of the upsetting cam. The impression segment is designed to barely clear in its revolution the edge 50 of the feed table 48. As the heel of the segment reaches the edge of the feed table, the pin 64 engages the forward jaw of the upsetting cam 59 and semi-rotates the latter, bringing the grippers 58 down upon the upper surface of the edge of the sheet and drawing the latter upon the impression segment where it is firmly held, the sheet wrapping about the face of the segment in its onward movement. A series of curved guides, one of which is shown at 67, Fig. 4, depending from the delivery board 68 serve to support the free end of the sheet as it is carried by the impression segment down upon the plate and printing bed. The impression is then taken by the rolling movement of the impression segment hereinabove described, the segment and printing bed moving at the same rate of speed. As the segment continues its revolution after the impression has been taken, and the heel thereof reaches the upper end of the vertical shaft 61 the lower pin 65 thereon engages the upsetting cam 59 and reverses its position causing the grippers 58 to release the edge of the printed sheet which is simultaneously grasped by the delivery mechanism the action of which is as follows:

The delivery mechanism is actuated by the gear wheel 53, Fig. 4, driven from the shaft 41 by the gear 67, Fig. 1. One end of the connecting piece 69 is pivoted to the gear wheel 53 while the other end is similarly pivoted to one arm of the L-shaped member 70 which is pivoted in the frame 49. The triangular extension forming the top of the frame 49 has pivoted therein the arms 71 and 72, the latter being pivoted to the remaining arm of the L-shaped member 70 by the connecting piece 73. The lower ends of the arms 71 and 72 are similarly connected by the short connecting piece 74. The projecting end of the short piece 74 is beveled and is furnished with the jaw 75. The to-and-fro movement of the arms 71 and 72 being caused by the revolution of the gear wheel 53, transmitted through the connecting members 69, 70 and 73, as above described, is so timed as to bring the short piece 74 forward into the position shown in Fig. 4 to meet the heel of the impression segment in its revolution carrying the printed sheet. The grippers on the segment release the sheet in the manner above described and it is at the same instant grasped between the beveled edge of the arm 74 and the jaw 75 and carried back to be released upon the delivery board 68.

It remains to describe the printing bed upon which the engraved plate rests, the manner in which it is mounted upon and carried by the rotary table and the means whereby it is caused to move in a right line beneath the inking and impression mechanisms. The printing bed is shown in plan at 76 in Fig. 2 midway between the impression and inking mechanisms in perspective in Fig. 3, as in the act of passing under the inking mechanism, in side elevation in Fig. 4, as passing beneath the impression segment, and in detail, in plan, in Fig. 11, in vertical section in Fig. 12 and partly in end elevation, partly in cross-section in Fig. 13.

In Figs. 11 and 12, the printing bed 76 is mounted upon the rotary table by means of the lug pivot 77, the head of which is adapted to slide in the transverse slot 78 shown in dotted lines in Fig. 11, the shank of the lug-pivot 77 being secured in the rotary table. The printing bed is provided at one end with the raised edge 79 against which one edge of the engraved plate rests, and at the opposite end with a corresponding bar 80 which is adjustably secured to the printing bed by means of the set-screws 81 mounted in the slides 82. By this means an engraved plate of any size may be clamped upon the printing bed.

One end of the printing bed is suitably recessed to admit the insertion of the lamps 83 for heating the bed, the recessed passages being extended throughout the bed in order that the heat may be applied to all parts thereof, as shown in Fig. 12.

It is essential that the printing bed shall pass in a straight or right line beneath the inking and impression mechanisms, and to that end the bed 1 upon which the rotary table is mounted is provided with the guides 84, 85, 86 and 87, Fig. 2. The manner hereinabove described in which the printing bed is mounted upon the rotary table allows the bed two motions, pivotal and transverse, thus enabling the bed to be carried by the rotation of the table between each pair of guides in a right or straight line. The forward outer corner of the printing bed is provided with the roller 88 which assists the outer guides 85 and 87, Fig. 2, in bringing the printing bed into position to pass under the impression and inking mechanisms. To prevent the printing bed from being carried too far outward after passing between the guides beneath the inking and impression mechanisms, the rotary table 2 is provided with the pins 91 mounted in said table between the inner side of the printing bed and the inner periphery of said table, as shown in Fig. 2. The inner edge of the printing bed coming into contact with said pins, the printing bed is maintained thereby in position to be swung by its roller 88 and the outer guides 85 and 87 into position to pass beneath the inking and impression mechanisms. Each side of the printing bed is provided with the sectional track 92, the structure and function of which has been hereinabove described in connection with the process of inking the plate.

While I have described and shown a single printing bed carried on the rotary table, with the action of the impression mechanism timed therefor, I do not wish to be understood as confining myself to the use of a single printing bed in connection with the other elements of my invention, as a plurality of printing beds may be employed by a merely mechanical alteration in the ratio of the gears actuating the impression mechanism.

What we claim as our invention and desire to secure by Letters Patent is—

1. In combination, a horizontal shaft, means comprising the disk 20, shaft 21 and gear 22 for imparting an eccentric motion thereto, a vertically adjustable wiping-pad carried by said horizontal shaft, a delivery roll, a winding roll actuated thereby, a wiping strip carried from said delivery roll over the face of said wiping pad to said winding roll, and means for periodically shifting the wiping strip upon said wiping-pad, substantially as described.

2. In combination, an annular rotary table, a printing bed carried thereby and capable of a pivotal and transverse motion thereon, an eccentrically moving horizontal shaft mounted over said rotary table, a wiping-pad carried by said horizontal shaft and vertically adjustable relatively to said printing-bed, a delivery roll, a winding roll actuated thereby, a wiping strip carried by said delivery roll and passing over the face of said wiping pad to said winding roll and means comprising the ratchet and pawl mechanism 31, ratchet rod 32, roller 34, rollers 36 and 37 and raised section 35 for shifting said wiping strip upon said wiping pad, substantially as described.

3. In combination, a horizontal shaft, means comprising the disk 20$^1$, shaft 21$^1$, and gear 22$^1$, for imparting an eccentric motion thereto, a vertically adjustable polishing pad carried by said horizontal shaft, a delivery roll, a winding roll actuated thereby, a tank, a polishing strip carried from said delivery roll through said tank, thence over the face of said polishing pad to said winding roll, and means for periodically shifting the polishing strip upon said polishing pad, substantially as described.

4. In combination, a rotary table, a printing bed carried thereby and capable of both pivotal and transverse motion thereon, an impression segment mounted over said rotary table and adapted to exert a rolling pressure upon said printing bed, grippers adapted to automatically grip the sheet, draw the same upon the impression segment, retain it during impression and release it from the segment after impression, guides adapted to cause said printing bed to move in a right line beneath said impression segment, and means whereby said table and impression segment may be rotated at the same rate of speed, substantially as described.

5. In combination, a rotary table, a printing bed carried thereby and capable of pivotal and transverse movement, an impression segment adapted to rotate at the same rate of speed as that of the table and printing bed and to exert a rocking pressure upon said printing bed, an inking mechanism, a wiping mechanism consisting of a horizontal shaft, a wiping pad carried thereby and means for imparting an eccentric movement to said horizontal shaft and wiping pad, a polishing mechanism consisting of a horizontal shaft, a polishing pad carried thereby, a delivery roll, a winding roll, a reservoir, a polishing strip carried from said delivery roll, through said reservoir and over the face of said polishing pad to said winding roll, means for periodically and automatically shifting said polishing strip upon said polishing pad, and means for imparting an eccentric motion to said horizontal shaft and polishing pad, and guides adapted to direct said printing bed in a right line as it passes beneath said inking mechanism and impression segment, substantially as described.

6. In combination, means for feeding the sheet, consisting of a feed table, fingers controlling the edge thereof, a cam actuating said fingers and a tumbler adjustably secured to a gear wheel and adapted to actuate said cam; means for holding the sheet during impression, consisting of an impression segment the heel of which is furnished with grippers, an upsetting cam controlling said grippers, a vertical shaft actuated by said impression segment and provided with pins adapted to semi-rotate said upsetting cam and a compression spring adapted to maintain said upsetting cam in each position; and means for delivering the sheet, consisting of the arms 71 and 72, connecting piece 74 and jaw 75, actuated through the connecting members 69 and 73 by the gear wheel 53, substantially as described.

7. In combination, an annular rotary table, a printing bed mounted and capable of a pivotal and transverse motion thereon, a printing mechanism, consisting of a feed table, fingers controlling the edge thereof, means for actuating said fingers consisting of a cam, a gear wheel and a tumbler adjustably mounted thereon, an impression segment furnished with grippers and an upsetting cam, means comprising the shaft 61 and pins 64 and 65 for semi-rotating said upseting cam, a compression spring adapted to maintain said upsetting cam in position when semi-rotated, the arms 71 and 72, connecting piece 74, jaw 75 and connecting members 69 and 73, and guides adapted to cause said printing bed to move in a right line beneath said impression segment, substantially as described.

8. In an automatic plate printing machine, an annular rotary table, a printing bed mounted and capable of a pivotal and lateral movement thereon, an impression segment disposed above said rotary table and adapted to move at the same rate of speed as that of said table and printing bed, an inking mechanism disposed above said table, a wiping mechanism consisting of the rod 19, block 26, frame 25, wiping pad 24 and springs 28, with means comprising the disk 20, shaft 21 and gear 22 for imparting an eccentric movement to the rod 19, said impression segment, inking and wiping mechanisms being actuated by the rotation of said table, and guides adapted to cause said printing bed to move in a right line beneath said inking mechanism and said impression segment, substantially as described.

9. In combination, the horizontal rod 19, the block 26, the frame 25, the wiping pad 24 and springs 28, and means comprising the disk 20, shaft 21 and gear 22 for imparting an eccentric movement to said horizontal rod, substantially as described.

In testimony whereof we hereto affix our signatures in presence of two witnesses.

THOMAS R. DEMERY.
JOSEPH H. DEMERY.

Witnesses:
JOHN S. MATHER,
H. B. SCHERMERHORN.